US009616759B2

(12) United States Patent
Matsuda et al.

(10) Patent No.: US 9,616,759 B2
(45) Date of Patent: Apr. 11, 2017

(54) ELECTRIC VEHICLE (71) Applicant: KAWASAKI JUKOGYO KABUSHIKI KAISHA, Kobe-shi, Hyogo (JP)

(72) Inventors: Yoshimoto Matsuda, Kobe (JP); Kazuma Waida, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 7 days.

(21) Appl. No.: 14/436,054

(22) PCT Filed: Oct. 15, 2012

(86) PCT No.: PCT/JP2012/006580
§ 371 (c)(1),
(2) Date: Apr. 15, 2015

(87) PCT Pub. No.: WO2014/061052
PCT Pub. Date: Apr. 24, 2014

(65) Prior Publication Data
US 2015/0266386 A1    Sep. 24, 2015

(51) Int. Cl.
H02P 1/00 (2006.01)
B60N 2/00 (2006.01)
(Continued)

(52) U.S. Cl.
CPC ....... B60L 11/1803 (2013.01); B60L 11/1816 (2013.01); B60L 11/1824 (2013.01);
(Continued)

(58) Field of Classification Search
CPC .............. B60L 11/1803; B60L 11/1824; B60L 11/1877; B60L 11/1864; B60L 11/1853;
(Continued)

(56) References Cited

U.S. PATENT DOCUMENTS

2009/0315359 A1* 12/2009 Suzuki ................ B60K 1/04
296/64

FOREIGN PATENT DOCUMENTS

JP      11291843 A     10/1999
JP    2005261180 A      9/2005
(Continued)

OTHER PUBLICATIONS

ISA Japanese Patent Office, International Search Report Issued in International Application No. PCT/JP2012/006580, Nov. 20, 2012, WIPO, 4 pages.

Primary Examiner — Bentsu Ro
Assistant Examiner — Zemenay Truneh
(74) Attorney, Agent, or Firm — Alleman Hall McCoy Russell & Tuttle LLP (57) ABSTRACT An electric vehicle comprises an electric motor which rotates a wheel; a battery which is an electric power supply unit for the electric motor; and a battery accommodating space which is provided in a vehicle body and accommodates the battery therein; wherein the battery accommodating space includes a first accommodating section which stores a standard battery pack including a first battery as the battery, and a second accommodating section which accommodates an optional battery pack including a second battery as the battery such that the optional battery pack is removable from the vehicle body, and wherein a voltage of the first battery is a value corresponding to an activation voltage of the electric motor, and the electric vehicle is capable of driving with an electric power supplied from at least the first battery.

18 Claims, 6 Drawing Sheets (51) Int. Cl.
*B60L 11/18* (2006.01)
*H02P 3/14* (2006.01)
*H02J 1/08* (2006.01)
*H02J 7/34* (2006.01)
*B60K 1/04* (2006.01)
*H02P 4/00* (2006.01)

(52) U.S. Cl.
CPC ....... *B60L 11/1853* (2013.01); *B60L 11/1864* (2013.01); *B60L 11/1877* (2013.01); *H02P 3/14* (2013.01); *B60K 1/04* (2013.01); *B60L 2200/36* (2013.01); *B60L 2270/20* (2013.01); *B60Y 2200/86* (2013.01); *H02J 1/08* (2013.01); *H02J 7/34* (2013.01); *H02P 4/00* (2013.01); *Y02T 10/642* (2013.01); *Y02T 10/7005* (2013.01); *Y02T 10/7061* (2013.01); *Y02T 10/7072* (2013.01); *Y02T 90/14* (2013.01)

(58) Field of Classification Search
CPC .... B60L 2200/36; B60L 2270/20; H02P 4/00; H02P 3/14; B60K 1/04; Y02T 10/7061; Y02T 10/7005; Y02T 90/14; Y02T 10/7072; Y02T 10/642; H02J 1/08; H02J 7/34; B60Y 2200/86
USPC ............................................. 318/139; 296/64
See application file for complete search history.

(56) References Cited

FOREIGN PATENT DOCUMENTS

| | | |
|---|---|---|
| JP | 2008131769 A | 6/2008 |
| JP | 2010004666 A | 1/2010 |
| JP | 2010028881 A | 2/2010 |
| JP | 2011073582 A | 4/2011 |
| JP | 2012151916 A | 8/2012 |

\* cited by examiner

Fig. 6

ELECTRIC VEHICLE

TECHNICAL FIELD

The present invention relates to an electric vehicle including an electric motor which rotates a wheel, and a battery as an electric power supply unit for the electric motor.

BACKGROUND ART

In an electric vehicle such as an electric four-wheeled vehicle, a wheel is rotated with a driving power generated by an electric motor. The electric vehicle incorporates a battery for use as an electric power supply unit for the electric motor.

CITATION LIST

Patent Literature

Patent Literature 1: Japanese Laid-Open Patent Application Publication No. 2011-73582

SUMMARY OF INVENTION

Technical Problem

A battery capacity affects a cruising distance. Among devices mounted in the electric vehicle, a battery is a device having a relatively heavy weight per unit volume. Because of this, if an attempt is made to increase the size of the battery to increase the battery capacity, in order to increase the cruising distance of the electric vehicle, the weight of the entire electric vehicle is increased.

In view of these circumstances, an object of the present invention is to provide an electric vehicle which can increase a cruising distance and reduce the weight of the electric vehicle.

Solution to Problem

The present invention has been developed to achieve the above described object. According to the present invention, there is provided an electric vehicle comprising: an electric motor which rotates a wheel; a battery which is an electric power supply unit for the electric motor; and a battery accommodating space which is provided in a vehicle body and accommodates the battery therein; wherein the battery accommodating space includes a first accommodating section which accommodates therein a standard battery pack including a first battery as the battery, and a second accommodating section which accommodates therein an optional battery pack including a second battery as the battery, such that the optional battery pack is removable from the vehicle body, and wherein a voltage of the first battery is a value corresponding to an activation voltage of the electric motor, and the electric vehicle is capable of driving with an electric power supplied from at least the first battery.

In accordance with this configuration, by mounting the optional battery pack to the vehicle body, a battery capacity can be increased, while by removing the optional battery pack, the weight of the electric vehicle can be reduced. In this way, the increase of the battery capacity or the reduction of the weight of the vehicle body can be selected as desired. Since the electric vehicle is capable of driving with only the electric power stored in the first battery, the electric vehicle can smoothly drive even in a state in which the optional battery pack is removed and only the standard battery pack is mounted to the vehicle body.

The electric vehicle may further comprise an electric power supply switching unit which performs switching between a first electric power supply state, in which only the electric power stored in the first battery is supplied to the electric motor, and a second electric power supply state, in which the electric power stored in at least the second battery is supplied to the electric motor in a state in which the optional battery pack is mounted to the vehicle body.

In accordance with this configuration, with the operation of the electric power supply switching unit, it becomes possible to select the state in which the electric vehicle drives by utilizing only the electric power stored in the first battery or the state in which the electric vehicle drives with the electric power stored in the second battery of the optional battery pack. This can suppress excess discharging of the first battery and the second battery, and hence prevent performance degradation of the batteries.

A voltage of the second battery may be a value corresponding to the activation voltage of the electric motor, and the second battery may be electrically connected in parallel with the first battery in a state in which the optional battery pack is accommodated in the second accommodating section, and in the second electric power supply state, the electric power stored in the second battery may be supplied to the electric motor and the first battery may be disconnected from the electric motor.

In accordance with this configuration, with the operation of the electric power supply switching unit, in a state in which the optional battery pack is mounted to the vehicle body, it becomes possible to select the state in which the electric vehicle drives with only the electric power stored in the first battery or the state in which the electric vehicle drives with only the electric power stored in the second battery.

The electric vehicle may further comprise an inhibiting circuit which inhibits the electric power from being simultaneously supplied from the first battery and the second battery to the electric motor.

In accordance with this configuration, it becomes possible to prevent an electric failure, in which a current flows from one of the first and second batteries to the other in a case where a remaining battery level is different between the first battery and the second battery.

The electric vehicle may further comprise a control unit which performs switching between the first electric power supply state and the second electric power supply state based on a battery state and/or a vehicle state.

In accordance with this configuration, the switching of the electric power supply state automatically occurs, based on the battery state and/or the vehicle state. Thus, the battery can be operated optimally and, for example, excess discharging of the battery can be suppressed.

The standard battery pack and the optional battery pack may have the same structure.

In accordance with this configuration, since the kinds of the components required to manufacture the electric vehicle can be reduced, a manufacture and a user of the electric vehicle can easily manage the battery packs.

The vehicle body may have an identification structure for allowing the battery pack to identify whether the battery pack is accommodated in the first accommodating section or in the second accommodating section.

In accordance with this configuration, in a case where the standard battery pack and the optional battery pack have the same structure, the battery pack can identify whether the battery pack should serve as the standard battery pack or the optional battery pack.

The electric vehicle may further comprise a charging connector which is electrically connected to the first battery, the charging connector being connected to the second battery in a state in which the optional battery pack is accommodated in the second accommodating section, and a charging control section which selects the battery to be charged with the electric power supplied from the charging connector, based on a battery state.

In accordance with this configuration, when the electric power can be supplied from the charging connector to the battery, the first battery and the second battery can be charged. Because of this, the user can easily carry out the operation for charging the batteries, without a need to perform the operation for charging the first battery and the operation for charging the second battery in a separate manner. In addition, since the charging control section selects the battery to be charged based on the battery state, during charging, the excess charging of the battery can be suppressed. Only the first battery, only the second battery, or both the first and the second batteries may be charged with the electric power supplied from the charging connector.

The first accommodating section and the second accommodating section may be longer in dimension in a rightward and leftward direction than in a forward and rearward direction, and may be arranged in the forward and rearward direction.

In accordance with this configuration, the battery packs which are laterally elongated can be arranged in the forward and rearward direction. Therefore, even when the battery pack has a heavy weight, it becomes easy to locate the center of gravity of the entire electric vehicle in the vicinity of a center in a vehicle width direction, while preventing a situation in which the center of gravity of the entire electric vehicle is located at one side in the vehicle width direction with respect to the center in the vehicle width direction.

The first accommodating section may be placed in a center portion of the electric vehicle in a vehicle length direction.

In accordance with this configuration, the standard battery pack is placed in the center portion of the electric vehicle in the vehicle length direction. Therefore, even when the battery pack has a heavy weight, it becomes easy to locate the center of gravity of the entire vehicle in the vicinity of a center in a vehicle length direction, while preventing a situation in which the center of gravity of the entire electric vehicle is located at one side in the vehicle length direction with respect to the center in the vehicle length direction.

The electric vehicle may further comprise an inverter which converts the electric power stored in the battery into AC power and supplies the AC power to the electric motor, and the inverter may be adjacent to the battery accommodating space at one side in a vehicle width direction.

In a case where the inverter is adjacent to the battery accommodating space at one side in the forward and rearward direction, the battery pack which is closer to the inverter and the battery pack which is more distant from the inverter exist, which may make a significant difference in length of a wire connecting the battery pack to the inverter. In accordance with the above configuration, the standard battery pack and the optional battery pack which are arranged in the vehicle length direction can be connected to the inverter via short wires, respectively. Thus, voltage drops in the wires can be made uniform and small.

The electric motor may be positioned at the one side in the vehicle width direction, with respect to a center of the electric vehicle in the vehicle width direction.

In accordance with this configuration, the electric motor can be made close to the inverter, and can be connected to the inverter via a short wire. Thus, a voltage drop in this wire can be reduced.

Advantageous Effects of Invention

As should be appreciated in the foregoing description, in accordance with the present invention, it becomes possible to provide an electric vehicle which can increase a cruising distance and reduce the weight of the electric vehicle.

DESCRIPTION OF EMBODIMENTS

Hereinafter, the embodiment of the present invention will be described with reference to the accompanying drawings. Throughout the drawings, the same or corresponding components are designated by the same reference numerals and will not be described repeatedly. Hereinafter, the stated directions are referenced from the perspective of a driver or a passenger riding in a utility vehicle according to the embodiment of the present invention. Also, a vehicle length direction corresponds to a forward and rearward direction, and a vehicle width direction corresponds to a rightward and leftward direction.

Figure 1:
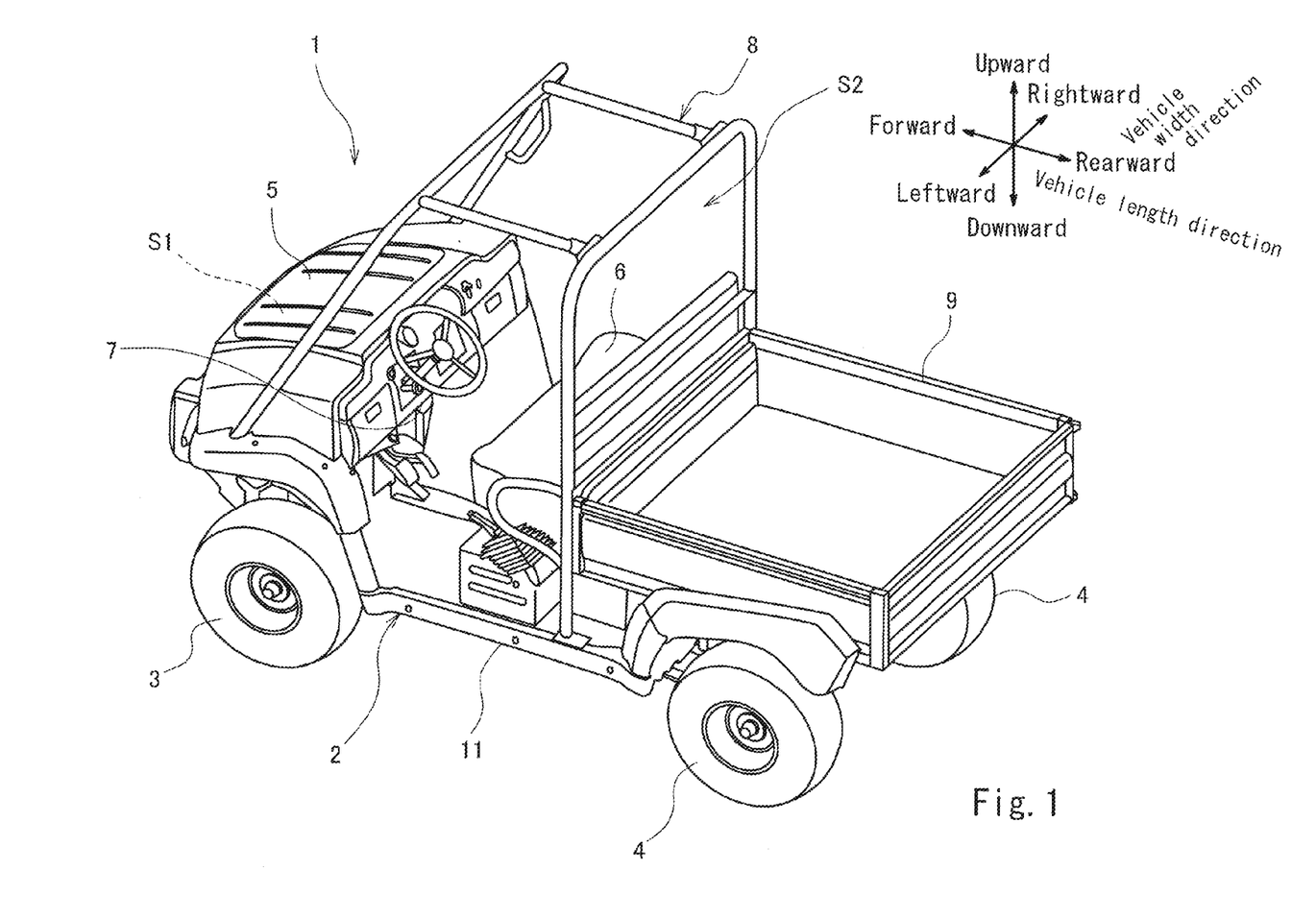
FIG. 1 is a perspective view showing a utility vehicle according to Embodiment 1 of the present invention.

FIG. 1 is a perspective view showing a utility vehicle 1 according to Embodiment 1 of the present invention. As shown in FIG. 1, the utility vehicle 1 is an electric vehicle which does not include an internal combustion engine and generates a rotational driving power with an electric power supplied from an electric power supply unit to activate a wheel. The utility vehicle 1 includes a pair of right and left front wheels 3 at the front portion of a vehicle body 2 and a pair of right and left rear wheels 4 at the rear portion of the vehicle body 2. Each of the front wheels 3 and the rear wheels 4 includes a balloon tire. A front space S1 formed between the right and left front wheels 3 is covered with a hood 5. In a location which is rearward relative to the hood 5 and in the vicinity of the center of the vehicle body 2, in the forward and rearward direction, there is provided a seat 6 which is laterally elongated (in the rightward and leftward direction) and on which a driver and a passenger are seated. The vehicle body 2 is provided with a dash board 7 which defines a front space S1 and a riding space S2 in which the seat S6 is placed. The vehicle body 2 is provided with a cabin frame 8 (ROPS) which surrounds the riding space S2 in which the seat 6 is placed, and extends from the right and left sides of the hood 5 to a portion of a floor frame 11, of which the portion is located below and rearward relative to the seat 6.

The cabin frame 8 is constituted by metal cylindrical pipes, and is configured to open the front side, rear side, right side, left side, and upper side of the riding space S2. The vehicle body 2 is provided with a cargo bed 9 in a location which is rearward relative to the riding space S2. The cargo bed 9 has a bottom wall of a rectangular shape when viewed from above, and side walls protruding upward from four sides of the bottom wall, and is opened upward. The cargo bed 9 can be banked manually or automatically.

Figure 2:
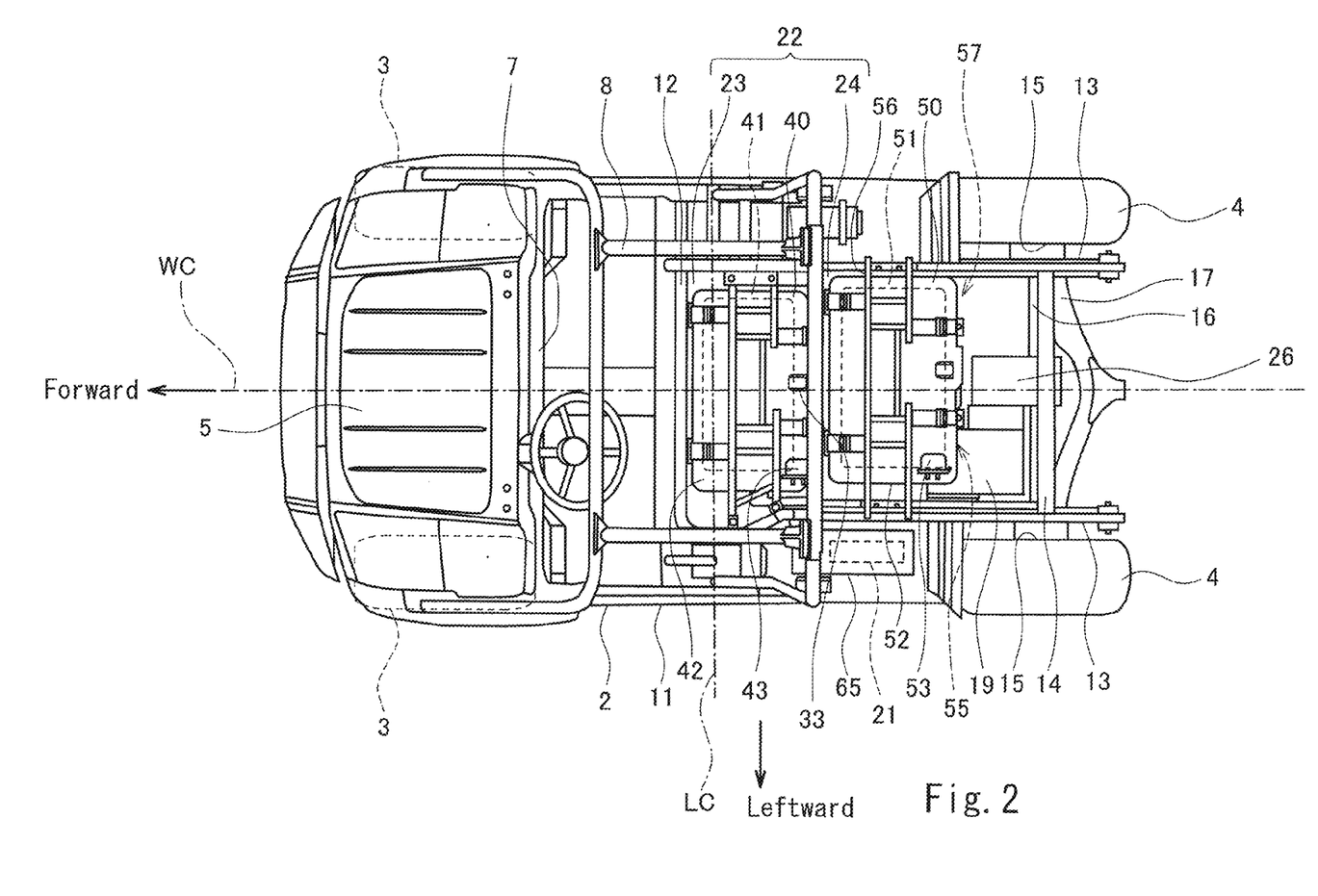
FIG. 2 is a plan view of the utility vehicle of FIG. 1.

FIG. 2 is a plan view of the utility vehicle 1 of FIG. 1. FIG. 2 shows a state in which the seat 6 and the cargo bed 9 (FIG. 1) are detached. As shown in FIG. 2, the vehicle body 2 includes a seat frame 12 supporting the seat 6 (see FIG. 1) from below. The front end portions of a pair of right and left rear frames 13 extending in the forward and rearward direction are connected to the seat frame 12. The rear frames 13 support the cargo bed 9 (see FIG. 1) from below. The rear end portions of the right and left rear frames 13 are connected to each other via a cross member 14 extending in the vehicle width direction. Axles 16 extending in the vehicle width direction are connected to the rear wheels 4, respectively. A coupling member 17 coupling hubs 15 of the right and left rear wheels 4 to each other extends in the vehicle width direction, in a location which is rearward relative to the axles 16.

The vehicle body 2 is provided with an electric motor 19 for rotating the rear wheels 4 (front wheels 3 as well as the rear wheels 4, in four-wheel drive), an inverter 21 for controlling the electric motor 19, and a battery storing an electric power supplied to the inverter 21. The utility vehicle 1 is configured to incorporate two battery packs 40, 50 including batteries, respectively. In other words, the vehicle body 2 is provided with a battery accommodating space 22 in which the two battery packs 40, 50 are accommodated. The battery accommodating space 22 includes a first accommodating section 23 which accommodates the standard battery pack 40 including a first battery 41, and a second accommodating section 24 which accommodates the optional battery pack 50 including a second battery 51 such that the optional battery pack 50 is removable from the vehicle body 2.

During the use of the electric vehicle, in principle, the standard battery pack 40 is always accommodated in the first accommodating section 23. The optional battery pack 50 is accommodated in the second accommodating section 24 according to the user's preference. The battery pack is not always accommodated in the second accommodating section 24. In other words, in a state in which the optional battery pack 50 is not accommodated in the second accommodating section 24, the utility vehicle 1 can drive on a road with the electric power stored in the battery 41 of the standard battery pack 40 accommodated in the first accommodating section 23.

The battery pack 40 includes a casing 42 for accommodating the battery 41, while the battery pack 50 includes a casing 52 for accommodating the battery 51. The battery pack 40 includes a charging port 43 for connecting an outside charging connector to the outer surface (upper surface in present example) of the left portion of the casing 42, while the battery pack 50 includes a charging port 53 for connecting the outside charging connector to the outer surface (upper surface in present example) of the left portion of the casing 52. By connecting the outside charging connector to the charging port 43, 53, the battery 41, 51 corresponding to the charging port 43, 53, can be charged. Alternatively, when the outside charging connector is connected to one of the charging ports, in a state in which the optional battery pack 50 is mounted to the vehicle body 2, the battery corresponding to the other charging port may be charged.

In the utility vehicle 1 configured as described above, the inverter 21 converts the electric power stored in the battery into AC power. AC power is supplied from the inverter 21 to an electric motor 19, which generates a driving power for moving the vehicle body 2. The electric motor 19 is connected to the axles 16 via a driving power transmission mechanism 25. The driving power generated in the electric motor 19 is transmitted to the right and left rear wheels 4 via the driving power transmission mechanism 25 and the right and left axles 16. Thus, the right and left rear wheels 4 can be rotated.

Hereinafter, the electric configuration of the utility vehicle 1 will be described. Then, the layout of the battery accommodating space 22, and the components and devices which are located in the vicinity of the battery accommodating space 22, will be described.

Figure 3:
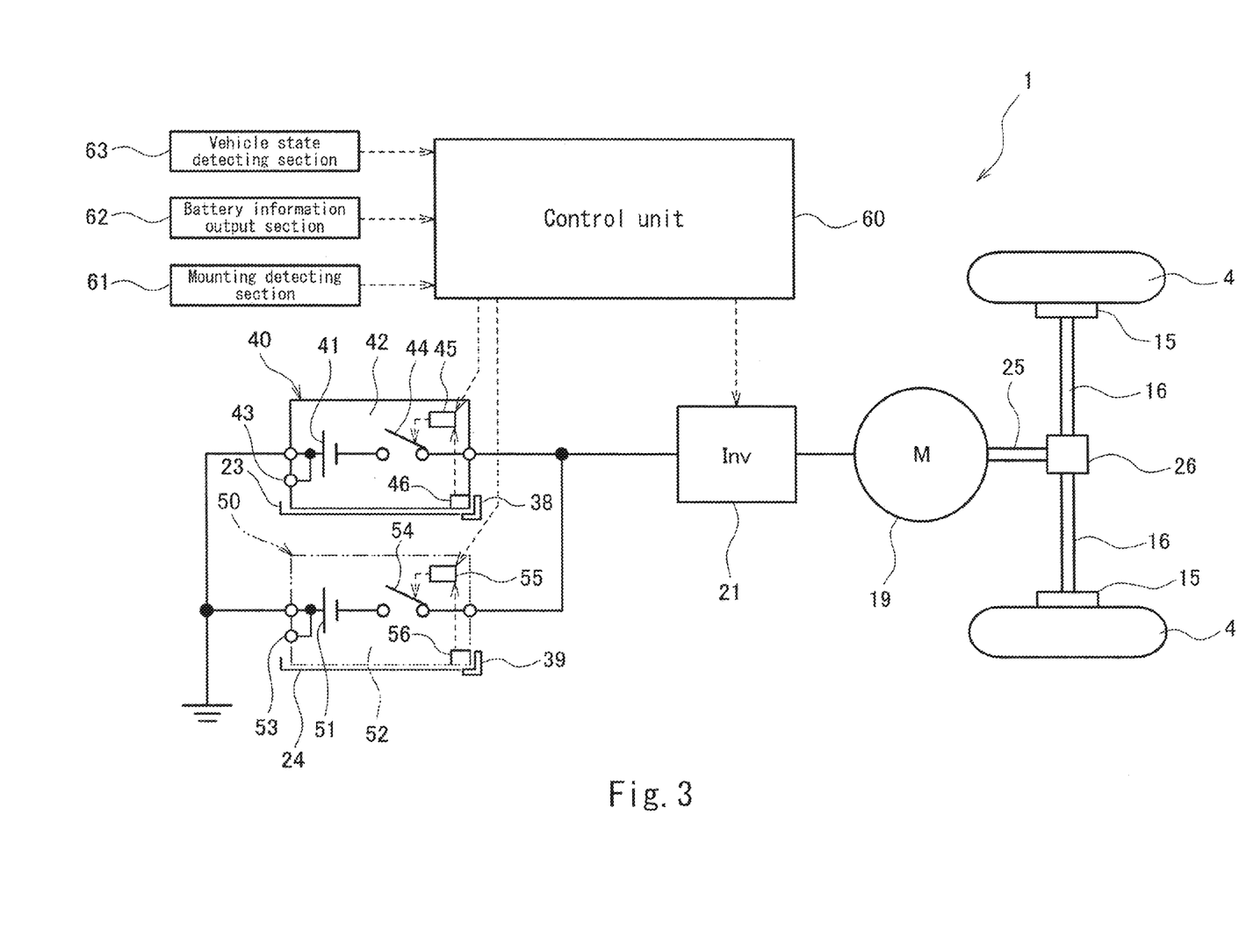
FIG. 3 is a block diagram showing the electric configuration of the utility vehicle of FIG. 1.

FIG. 3 is a block diagram showing the electric configuration of the utility vehicle 1 of FIG. 1. FIG. 3 shows that the standard battery pack 40 is schematically indicated by a solid line, because the standard battery pack 40 is always mounted to the vehicle body 2, while the optional battery pack 50 is indicated by a two-dotted line, because the optional battery pack 50 is mounted to and/or removed from the vehicle body 2 as desired. As shown in FIG. 3, the battery pack 40 includes a first electric power supply switching unit 44 connected in series with the first battery 41 inside the casing 42, while the battery pack 50 includes a second electric power supply switching unit 54 connected in series with the second battery 51 inside the casing 52. In a state in which the optional battery pack 50 is mounted to the vehicle body 2, a set of the first battery 41 and the first electric power supply switching unit 44, and a set of the second battery 51 and the second electric power supply switching unit 54 are connected in parallel with the inverter 21.

Each of the electric power supply switching units 44, 54 is, for example, a switch or a relay. The first electric power supply switching unit 44 opens/closes the wire connecting the first battery 41 and the inverter 21 to each other, while the second electric power supply switching unit 54 opens/closes the wire connecting the second battery 51 and the inverter 21 to each other. When the first electric power supply switching unit 44 is opened, the first battery 41 and the inverter 21 are electrically disconnected from each other, and the electric power stored in the first battery 41 cannot be supplied to the inverter 21. When the first electric power supply switching unit 44 is closed, the first battery 41 is electrically connected to the inverter 21 and hence the electric motor 19, and the electric power stored in the first battery 41 can be supplied to the inverter 21, thereby allowing the electric motor 19 to be activated with the electric power. The same action occurs when the second electric power supply switching unit 54 is opened or closed.

In the present embodiment, the first electric power supply switching unit 44 and the second electric power supply switching unit 54 are automatically operated. To this end, the utility vehicle 1 includes a control unit 60 for controlling the opening/closing of the electric power supply switching units 44, 54, as an electric component mounted in the electric vehicle. In the illustrated example, a vehicle control unit for controlling the inverter 21 also serves as the control unit for controlling the electric power supply switching units. However, this is merely exemplary, and a control unit which is other than the vehicle control unit may control the electric power supply switching units.

The control unit 60 is communicatively coupled to a mounting detecting section 61, and receives information indicating whether the optional battery pack 50 is properly accommodated in the second accommodating section 24 (see FIG. 2), from the mounting detecting section 61. The mounting detecting section 61 is, for example, a limit switch provided in the vicinity of the second accommodating section 24 (see FIG. 2).

The control unit 60 is communicatively coupled to a battery information output section 62, and receives state information of the first battery 41 from the battery information output section 62. In a state in which the optional battery pack 50 is accommodated in the second accommodating section 24 (see FIG. 2), the control unit 60 receives the state information of the second battery 51 from the battery information output section 62.

The "battery state information" includes, for example, remaining battery level (battery power) information, degradation state information, SOH (state of health) information, SOC (state of charge) information, function state information such as a discharging ability, SOF (state of function) information, battery temperature information, and information relating to electric characteristics such as a battery voltage or a current flowing through an electric wire connected to the battery. In a case where the utility vehicle 1 includes a control unit (battery monitoring unit) dedicated to the monitoring of the battery state, the battery information output section 62 may be the battery monitoring unit. In a case where the battery monitoring unit is configured to determine whether or not there is an abnormality in the battery, the state information may include information indicating a result of the determination performed by the battery monitoring unit (for example, whether or not there is an abnormality in the battery). The information indicating that there is an abnormality in the battery may include information indicating the abnormality of an electric component which is other than the battery inside the battery pack, namely, a state in which a relay remains incapable of moving from an opened state or a closed state. In a case where the battery monitoring unit is configured to determine the degree of the degradation state of the battery, the state information may include degradation degree information of the battery. The degradation degree may be determined based on the total charging time or total discharging time of the battery, and the degradation degree information may be information indicating the total charging time or total discharging time of the battery.

The battery information output section may be configured not to output the SOH information and the SOC information, and output information required for generating the SOH information and the SOC information. In this case, the control unit 60 may be configured to generate the SOH information and the SOC information with reference to the information required for generating the SOH information and the SOC information, which is output from the battery information output section.

In the present embodiment, the control unit 60 is communicatively coupled to a vehicle state information output section 63 and receives vehicle state information from the vehicle state information output section 63. The "vehicle state information" includes accelerator operation amount information, rotational speed information of the electric motor 19, driving speed information of the utility vehicle 1, and load weight information of the cargo bed 9 (in addition, seat 6). As described above, the control unit 60 of the present invention also serves as the vehicle control unit for controlling the inverter 21, and provides a control command to the inverter 21 based on the battery information received from the battery information output section 62 and the vehicle information received from the vehicle state information output section 63, to control the output torque and/or rotational speed of the electric motor 19.

The control unit 60 automatically operates the first electric power supply switching unit 44 and the second electric power supply switching unit 54, with reference to the information received from the mounting detecting section 61 and the information received from the battery information output section 62, to set the battery which operates as the electric power supply unit for the electric motor 19. In other words, the control unit 60 contains plural electric power supply states including a combination of the batteries which should operate as the electric power supply unit for the electric motor 19, selects one from among the plural electric power supply states, based on the information received from the mounting detecting section 61 and the information received from the battery information output section 62, and controls the opening/closing of the first electric power supply switching unit 44 and the second electric power supply switching unit 54 so that the selected electric power supply state can be realized. In the present embodiment, there exist two electric power supply switching units, and each of them is set to an open state or a closed state. Therefore, theoretically, four electric power supply states can be formed.

When the control unit 60 receives the information indicating that the optional battery pack 50 is not properly accommodated in the second accommodating section 24 (see FIG. 2), from the mounting detecting section 61, the control unit 60 controls or automatically operates the first electric power supply switching unit 44 of the standard battery pack 40, which is always mounted to the vehicle body 2 in principle, during the use of the vehicle such that the first electric power supply switching unit 44 is closed, thereby forming the first electric power supply state in which only the electric power stored in the first battery 41 is supplied to the electric motor 19.

The voltage of the first battery 41 is a value (for example, 100V) corresponding to the activation voltage of the electric motor 19. Therefore, the utility vehicle 1 is capable of driving on the road by activating the electric motor 19 with the electric power supplied from at least the first battery 41. Since the voltage of the first battery 41 is set in the above described manner, the utility vehicle 1 can drive smoothly in a state in which the optional battery pack 50 is removed and only the standard battery pack 40 is mounted to the vehicle body 2. In this state, because of the absence of the optional battery pack 50, the weight of the entire utility vehicle 1 can be reduced. In contrast, in a state in which the optional battery pack 50 is mounted to the vehicle body 2, the second battery 52 built into the optional battery pack 50 is connected to the inverter 21 in parallel with the first battery 41. Therefore, when the optional battery pack 50 is mounted to the vehicle body 2, the battery capacity of the utility vehicle 1 can be increased, and thus the cruising distance can be increased. As described above, when the optional battery pack 50 is mounted to the vehicle body 2, the battery capacity can be increased, while the optional battery pack 50 is removed from the vehicle body 2, the weight of the vehicle body 2 can be reduced. As described above, the user of the utility vehicle 1 can select the increase of the battery capacity or the reduction of the weight of the vehicle body 2, as desired, by selecting whether or not the optional battery pack 50 is mounted to the vehicle body 2.

When the control unit 60 is receiving the information indicating that the optional battery pack 50 is properly accommodated in the second accommodating section 24 (see FIG. 2), from the mounting detecting section 61, the control unit 60 performs switching between the above stated first electric power supply state and a second electric power supply state in which the electric power stored in the second battery 51 is supplied to the electric motor 19. In the first electric power supply state, the first electric power supply switching unit 44 is closed and the second electric power supply switching unit 54 is open.

The "second electric power supply state" includes an electric power supply state (hereinafter this state will be referred to as "second full electric power supply state") in which the electric power is supplied from both the first battery 41 and the second battery 51 to the electric motor 19, and an electric power supply state (hereinafter this state will be referred to as "second partial electric power supply state") in which the electric power stored in the second battery 52 is supplied to the electric motor 19 and the first battery 41 is electrically disconnected from the electric motor 19. In the second full electric power supply state, the first electric power supply switching unit 44 is closed and the second electric power supply switching unit 54 is closed. In the second partial electric power supply state, the first electric power supply switching unit 44 is open and the second electric power supply switching unit 54 is closed.

In a state in which the first electric power supply state is set, the second battery 52 does not operate as the electric power supply unit for the electric motor 19, even though the optional battery pack 50 is mounted to the vehicle body 2. In contrast, in a state in which the second partial electric power supply state is set, the first battery 41 does not operate as the electric power supply unit for the electric motor 19, even though the standard battery pack 40 is always mounted to the vehicle body 2 in principle, during the use of the vehicle.

In the present embodiment, the second battery 51 has a battery voltage which is substantially equal to that of the first battery 41 and is a value corresponding to the activation voltage of the electric motor 19, as in the first battery 41. Therefore, in a state in which the second partial electric power supply state is set, the electric motor 19 can be properly activated with only the electric power stored in the second battery 51, and as a result, the utility vehicle 1 can drive on the road.

In summary, the control unit 60 is capable of performing switching between the first electric power supply state and the second partial electric power supply state, thereby selecting the state in which the utility vehicle 1 drives with only the electric power stored in the first battery 41 or the state in which the utility vehicle 1 drives with only the electric power stored in the second battery 51. This can realize control intended to suppress excess discharging of the first battery 41 and the second battery 51.

Regarding the switching control of the electric power supply state, the control unit 60 performs switching of the electric power supply state based on the battery information received from the battery information output section 62 and/or the vehicle state received from the vehicle state information output section 63. For example, when the control unit 60 determines that one of the batteries is exhausted, namely, its SOH has decreased to a predetermined value or less, with reference to the information received from the battery information output section 62, the control unit 60 performs switching of the electric power supply state so that the other battery operates as the electric power supply unit for the electric motor 19. The control unit 60 may maintain a present electric power supply state, which is presently set, before a difference between the remaining battery level of one of the batteries and the remaining battery level of the other battery exceeds a predetermined value, with reference to the information received from the battery information output section 62, and perform switching of the electric power supply state to cause the battery with a higher remaining battery level to operate as the electric power supply unit for the electric motor 19, at a time point when the difference exceeds the predetermined value. This can make the remaining battery levels of the two batteries 41, 51 uniform, and prevent excess discharging of the batteries 41, 51.

To reduce a possibility of excess discharging, the control unit 60 may perform switching of the electric power supply state, when the remaining battery level of the battery reaches a switching remaining battery level set to a value which is higher than a limit remaining battery level at which the electric motor 19 cannot be activated well, and it becomes possible for the utility vehicle 1 to drive smoothly. This can maintain a state in which the utility vehicle 1 can drive by utilizing the battery operating as the electric power supply unit, after the switching is performed. In addition, the discharging of the battery, which has reached the switching remaining battery level can be ceased in a state in which its remaining battery level is not zero, which can suppress the degradation of the battery due to excess discharging for a period that passes until the charging of the battery is carried out. This switching remaining battery level may be a value pre-stored in the control unit 60, may be variably set by the control unit 60, depending on the degree of degradation, or may be set as desired by the driver. For example, in a case where it is estimated that a long time will pass until the charging is carried out, the driver may set the switching remaining battery level to a relatively large value, and thus, the degradation of the battery can be suitably suppressed. In the above described manner, the control unit may automatically perform switching of the electric power supply state, while allowing the driver to set a switching timing or switching trigger, depending on the use state. This can further improve convenience for the driver. Further, the control unit 60 may store as history information the information relating to the time intervals at which a charging operation is carried out. The control unit 60 may estimate a period that passes until the next charging is carried out, based on the history information, and variably set the switching remaining battery level based on the estimated value. Further, the estimated value may be calculated by a statistic method such as the average value of the history information or a standard deviation.

Further, when the control unit 60 determines that the temperature of one of the batteries has exceeded a predetermined value, with reference to the information received from the battery information output section 62, the control unit 60 may set the electric power supply state so that the other battery operates as the electric power supply unit for the electric motor 19. This can prevent an excess increase in the battery temperature. When the control unit 60 determines that there is an abnormality in one of the batteries, with reference to the information received from the battery information output section 62, the control unit 60 may cause the other battery having no abnormality to operate as the electric power supply unit for the electric motor 19, while inhibiting the use of the battery having the abnormality.

Further, when the control unit 60 determines that the activation torque which is equal to or larger than a predetermined value is necessary, with reference to the information received from the vehicle state information output section 63, the control unit 60 may set the electric power supply state so that the battery with a higher remaining battery level operates as the electric power supply unit for the electric motor 19, with reference to the information received from the battery information output section 62. On the other hand, when the control unit 60 determines that the activation torque which is equal to or larger than the predetermined value is not necessary, the control unit 60 may set the electric power supply state so that the battery with a lower remaining battery level operates as the electric power supply unit for the electric motor 19, with reference to the information received from the battery information output section 62. Further, when the control unit 60 determines that very large activation torque is necessary, for example, the vehicle loaded with luggage is accelerated or is driven on an upward slope, with reference to the information received from the vehicle state information output section 63, the control unit 60 may set the second full electric power supply state, in which both the first battery 41 and the second battery 51 operate as the electric power supply unit for the electric motor 19. This can prevent deficiencies in electric power.

Further, the control unit 60 may perform switching of the electric power supply state so that the degradation degree of the first battery 41 and the degradation degree of the second battery 51 become substantially equal to each other, with reference to the information received from the battery information output section 62. Further, the control unit 60 may perform switching of the electric power supply state so that the degradation degree of one of the first battery 41 and the second battery 51 will be progressed, with reference to the information received from the battery information output section 62. In this case, the control unit 60 may set the electric power supply state to suppress the degradation degree of the first battery 41, by progressing the degradation degree of the second battery 51 built into the optional battery pack 50 which is easily removably mounted to the vehicle body 2, as compared to the degradation degree of the first battery 41.

The automatic switching of the electric power supply state may be performed in the middle of driving which is other than accelerated/decelerated driving, for example, in a stopped state of the vehicle, driving at a constant speed, or low-speed driving. In a case where the driving power transmission mechanism 25 includes a clutch, the switching of the electric power supply state may be automatically performed in a state in which the driving power is cut off by the clutch. Further, in a case where the vehicle includes a mechanism for selecting whether or not to distribute the driving power to the front wheels 3, and is able to perform switching between a two-wheel drive state in which only the rear wheels 4 are driven, and a four-wheel drive state in which the front wheels 3 and the rear wheels 4 are driven, the automatic switching of the electric power supply state may be performed concurrently with the switching between the two-wheel drive state and the four-wheel drive state. Thus, even when a vehicle behavior fluctuates during switching, such a fluctuation can be suppressed.

Further, the automatic switching of the electric power supply state is preferably performed in a state in which the electric power is not supplied to the electric motor 19. For example, the automatic switching of the electric power supply state may be performed before electric power is supplied to the electric motor 19 (for example, when the operation of the electric component is checked in ignition-ON). This makes it possible to prevent the operation of the electric power supply switching unit in a state in which a current flows, and reduce the possibility of damaging the electric power supply switching unit. When the switching of the electric power supply state is performed in the middle of driving the vehicle, the electric power supply switching unit 44, 54 is preferably operated in a state in which electric power is not supplied to the electric motor 19. For example, the automatic switching of the electric power supply state may be performed when the vehicle is temporarily stopped and waits for a traffic light. This also makes it possible to reduce the possibility of damaging the electric power supply switching unit 44, 54. In switching the electric power supply state, preferably, a period is set in which both the first electric power supply switching unit 44 and the second electric power supply switching unit 54 are opened. This makes it possible to reduce the possibility that the two batteries 41, 51 are electrically connected to each other undesirably—for example, when switching from the first electric power supply state to the second partial electric power supply state occurs. As a result, it becomes possible to avoid an electric failure in which a current flows from one of the first battery 41 and the second battery 51 to the other when there is a significant difference in remaining battery level between the first battery 41 and the second battery 51.

Although the control unit 60 performs the switching of the electric power supply state in the above described manner, a switch (not shown) used to manually perform switching of the electric power supply state may be provided at a driver seat to allow the driver to perform the switching of the electric power supply state. Irrespective of whether the driver can manually perform switching of the electric power supply state, the driver seat may be provided with a display unit for displaying information indicating which of the batteries is operating as the electric power supply unit for the electric motor 19, or information indicating battery states such as the remaining battery levels of the two batteries 41, 51. This display unit may also display the information indicating the vehicle states. In a case where the driver can manually perform the switching of the electric power supply state, the driver can perform the switching operation with reference to the information displayed on the display unit, which is an advantage. Further, the driver seat may be provided with a switch (not shown) used to select whether the control unit automatically performs the switching of the electric power supply state or driver manually performs the switching of the electric power supply state. Since manual switching or automatic switching can be selected, the driver can carry out manual switching or automatic switching according to the current situation, which further improves convenience for the driver.

Since the control unit 60 performs the switching of the electric power supply state based on the information relating to the battery state and/or the information relating to the vehicle state, the cruising distance can be increased and the life of the batteries can be extended, as compared to a case where the driver manually performs the switching of the electric power supply state, which further improves convenience. Convenience can also be improved by performing the switching of the electric power supply state based on vehicle information such as the rotational speed of the electric motor 19, a driving history, or time that passes from when the vehicle was stopped previously, as well as the above described activation torque or vehicle speed, as the information relating to the vehicle states. The battery to be used when starting the vehicle may be selected based on the information relating to the battery state. For example, if the battery with a lower degradation degree or the battery with a higher remaining battery level is used for starting the vehicle, the vehicle can be started smoothly even after the vehicle is not used for a long period of time and, therefore, the batteries 41, 51 can be preserved for a longer period of time.

The utility vehicle 1 is also capable of charging the battery with regenerative power. In this case, the control unit 60 may electrically connect the battery with a lower remaining battery level to the electric motor 19 preferentially, with reference to the information received from the battery information output section 62. This allows the battery with a lower remaining battery level to be charged preferentially by utilizing regenerative power.

In the present embodiment, the standard battery pack 40 and the optional battery pack 50 have the same structure. The utility vehicle 1 has identification structures 38, 39 which allow the standard battery pack 40 and the optional battery pack 50 to identify whether each of them is accommodated in the first accommodating section 23 or the second accommodating section 24. The identification structures 38, 39 allow each of the battery packs to serve as the standard battery pack 40 or the optional battery pack 50.

Specifically, each of the electric power supply switching units includes a determiner section 45, 55, and an identification signal reading section 46, 56, in addition to an element for opening/closing the wire of the relay, the switch, for example. When the battery pack is accommodated into the first accommodating section 23 or the second accommodating section 24, the identification signal reading section 46, 56 is placed in a location which is close to the identification structure of the corresponding accommodating section, or in contact with the identification structure. The identification structure 38 accommodated in the first accommodating section 23 and the identification structure 39 accommodated in the second accommodating section 24 are different from each other in shape and the like. Each of the identification signal reading sections 46, 56 is configured to mechanically, electrically, or optically identify if it is placed close to or in contact with the identification structure 38 of the first accommodating section 23, if it is placed close to or in contact with the identification structure 39 of the second accommodating section 24, or if it is placed away from the identification structures 38, 39, based on the above difference between the identification structures 38, 39. The identification signal reading section 46, 56 outputs a signal corresponding to the identified state to the determiner section 45, 55. This allows the battery pack (especially determiner section) to identify whether to operate as the standard battery pack 40 accommodated in the first accommodating section 23 or as the optional battery pack 50 accommodated in the second accommodating section 24. The identification structures 38, 39 and the identification signal reading sections 46, 56 may be switches or harnesses, and may be configured in any way so long as the above function can be attained.

In the above configuration, even when the control unit 60 provides different operation commands at the same time to each of the standard battery pack 40 and the optional battery pack 50, both the battery pack accommodated in the first accommodating section 23 and the battery pack accommodated in the second accommodating section 24 properly perform their functions. For example, it is assumed that the control unit 60 provides operation commands to the electric power supply switching units at the same time to perform switching of the electric power supply state: to the first electric power supply switching unit 44 and to the second electric power supply switching unit 54. In this case, for example, to perform switching from the second partial electric power supply state to the first electric power supply state, the control unit 60 provides to the two batteries 40, 50 a command for shifting the first electric power supply switching unit 44 of the standard battery pack 40 from the open state to the closed state, and a command for shifting the second electric power supply switching unit 54 of the optional battery pack 50 from the closed state to the open state. The commands are provided to each of the determiner sections 45, 55. In response to the commands, the determiner sections 45, 55 operate the relays or the switches of the corresponding electric power supply units. The determiner section of the battery pack accommodated in the first accommodating section 23 identifies that the battery pack should operate as the standard battery pack 40, because of the cooperation with the identification signal reading sections 46, 56 and the identification structures 38, 39. Therefore, the determiner section of the battery pack accommodated in the first accommodating section 23 ignores the command for the second electric power supply switching unit 54, and causes the corresponding relay or switch to shift from the open state to the closed state, in response to the command for the first electric power supply unit 44. The determiner section of the second electric power supply switching unit 54 operates in the same manner. In this way, the relays can be individually controlled, even when the relays or switches of the electric power supply switching units are placed inside the battery packs. Note that the battery information output section 62 may output the state information of the battery which is added with identification information corresponding to the results of the identification performed by the identification signal reading sections 46, 56.

Figure 4:
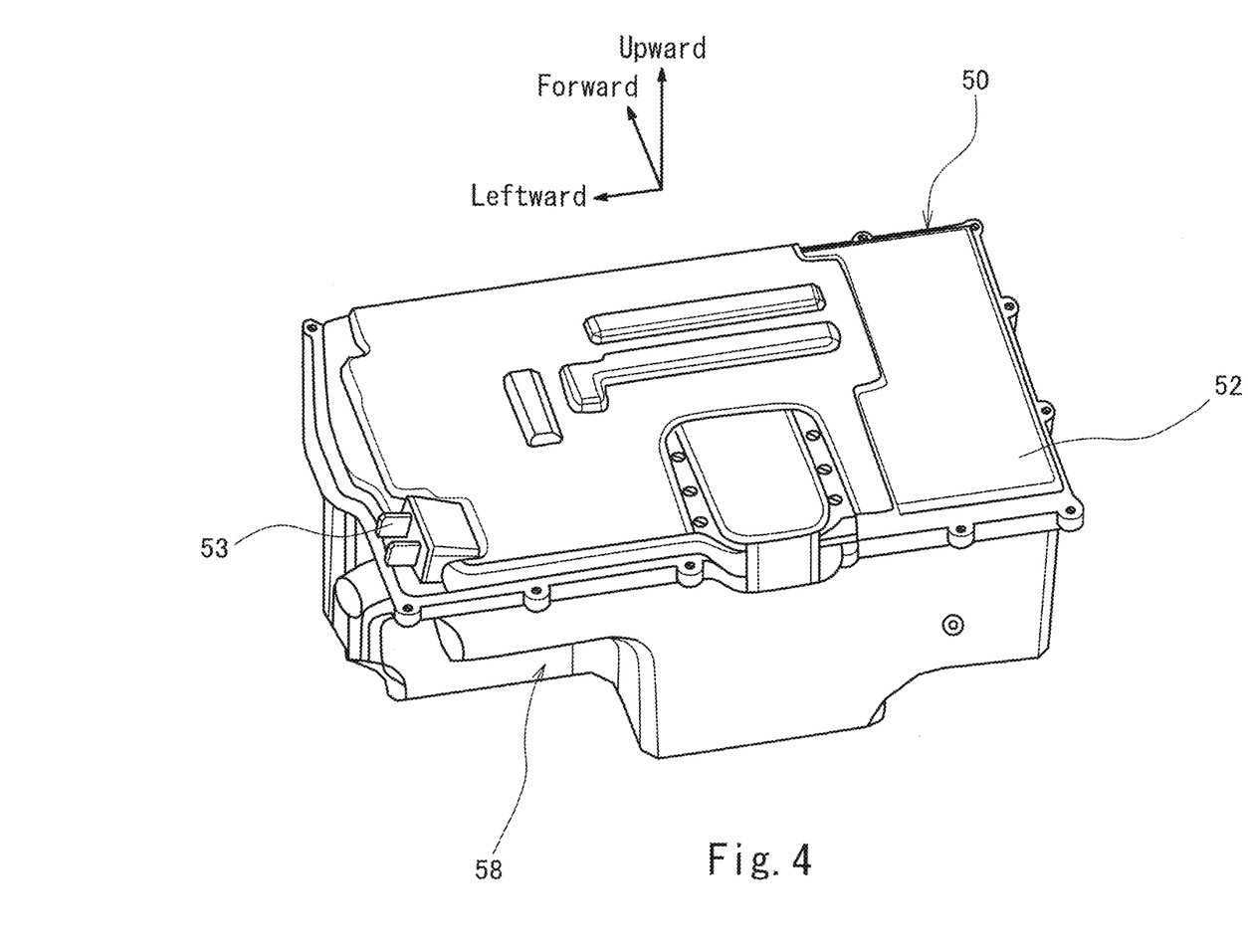
FIG. 4 is a perspective view of an optional battery pack of FIGS. 2 and 3.

FIG. 4 is a perspective view showing the external appearance of the optional battery pack 50 of FIGS. 2 and 3. As shown in FIG. 4, the optional battery pack 50 has the same structure as that of the standard battery pack 40 (see FIGS. 2 and 3). As described above, the second battery 51 (see FIG. 3) built into the optional battery pack 50 has a voltage which is substantially equal to the voltage of the first battery 41 (see FIG. 3) built into the standard battery pack 40. This allows the optional battery pack 50 to have the same structure as that of the standard battery pack 40. Since the optional battery pack 50 has the same structure as that of the standard battery pack 40, the number of components required to manufacture the utility vehicle 1 can be reduced, and the manufacturer and the user can easily manage the battery packs.

Turning to FIG. 2 again, the layout of the battery packs 40, 50, the components and the devices in the vicinity of the battery packs 40, 50 will be described. The electric motor 19, the inverter 21 and the battery packs 40, 50 are placed rearward relative to the dash board 7. Among these, other than the standard battery pack 40, the electric components 19, 21, 23 are placed rearward relative to the cabin frame 8 and below the cargo bed 9 (see FIG. 1) covering the electric components 19, 21, 23 from above. The standard battery pack 40 is placed in a space surrounded by the seat frame 12 below the seat 6. The first accommodating section 23 constitutes this space. The standard battery pack 40 is placed below the riding space S2. Normally, the standard battery pack 40 is hidden by the seat 6 and is invisible from the outside.

The second accommodating section 24 is placed rearward relative to the first accommodating section 23 and adjacently to the first accommodating section 23 in the forward and rearward direction. The second accommodating section 24 constitutes the entire space formed between the right and left rear frames 13. The optional battery pack 50 is removably (detachably) accommodated in the second accommodating section 24. In a state in which the optional battery pack 50 is accommodated in the second accommodating section 24, the optional battery pack 50 is placed rearward relative to the standard battery pack 40 and adjacently to the standard battery pack 40 in the forward and rearward direction.

The inverter 21 is placed outward (in the present example, leftward) in the vehicle width direction relative to the left rear frame 13. The electric motor 19 is placed rearward relative to the second accommodating section 24 and forward relative to the axles 16. In the present embodiment, the front portion of the electric motor 19 overlaps with the rear portion of the second accommodating section 24 at one side in the vehicle width direction.

The first accommodating section 23 and the second accommodating section 24 are elongated and longer in dimension in the rightward and leftward direction than in the forward and rearward direction. This allows the battery packs 40, 50 which are laterally elongated (in rightward and leftward direction) to be arranged in the forward and rearward direction. Even if the battery packs 40, 50 have a heavy weight, it becomes possible to prevent a situation in which the center of gravity of the entire vehicle is located at one side in the vehicle width direction with respect to the center WC in the vehicle width direction, and it becomes easy to locate the center of gravity of the entire vehicle in the vicinity of the center W in the vehicle width direction.

In the present embodiment, the utility vehicle 1 is provided with the first accommodating section 23 and the second accommodating section 24 for accommodating the two battery packs 40, 50, respectively, which are mechanically independent of each other, in the location below the seat 6 (see FIG. 1) and the location below the cargo bed 9 (see FIG. 1), respectively. The accommodating section provided below the seat 6 is the first accommodating section for accommodating the standard battery pack 40. The first accommodating section 23 is placed at the center portion of the vehicle, in the vehicle length direction. More specifically, the first accommodating section 23 is located on a center line LC (hereinafter will also be referred to as "vehicle length center LC") in the vehicle length direction, when viewed from above. The standard battery pack 40 is always mounted to the vehicle body 2 in principle, during the use of the vehicle. Since the standard battery pack 40 is placed at the center portion in the vehicle length direction, it becomes possible to prevent a situation in which the center of gravity of the entire vehicle is located at one side in the vehicle length direction with respect to the vehicle length center LC, and it becomes easy to locate the center of gravity of the entire vehicle in the vicinity of the vehicle length center LC.

In contrast, the accommodating section provided below the cargo bed 9 is the second accommodating section 24 for accommodating the optional battery pack 50. Above the cargo bed 9, the cabin frame 8 is not provided. When the cargo bed 9 is banked, the front region of the space below the cargo bed 9 is exposed when viewed from above. The second accommodating section 24 is provided in the front region of the space below the cargo bed 9, which region is adjacent to the seat 6. Since the second accommodating section 24 is exposed when viewed from above, merely by banking the cargo bed 9, the second accommodating section 24 is easily accessible as compared to a case where the second accommodating section 24 is located in the space below the seat 6. For this reason, as compared to the first accommodating section 23, the second accommodating section 24 is suitable for use as the mounting space of the optional battery pack 50 which is optionally mounted to the vehicle body 2, after assembly of the vehicle body 2 is finished. In addition, the optional battery pack 50 can be easily removably mounted in the second accommodating section 24.

The entire inverter 21 is placed adjacent to the first accommodating section 23 and the second accommodating section 24 in the vehicle width direction. If the inverter 21 is placed forward relative to the first accommodating section 23, the wire connecting the first battery 41 and the inverter 21 to each other is reduced, whereas the wire connecting the second battery 51 and the inverter 21 to each other is increased. If the inverter 21 is placed rearward relative to the second accommodating section 24, the reverse relationship is formed. Thus, the non-uniformity of the wire length occurs. In accordance with the layout of the inverter 21 of the present embodiment, the distance from the standard battery pack 40 to the inverter 21 and the distance from the optional battery pack 50 to the inverter 21 can be made substantially equal to each other. This can make the electric characteristics (for example, a voltage drop) uniform.

The entire inverter 21 is placed at one side (in the present example, left side) in the vehicle width direction, relative to the rear frame 13 at one side (in the present example, left side) in the vehicle width direction. The inverter 21 is not placed in the space surrounded by the right and left rear frames 13, and this space is utilized as the second accommodating section 24. This can increase the optional battery pack 50 in size. By suspending and lifting up the optional battery pack 50 from the second accommodating section 24, the optional battery pack 50 can be easily taken out without interfering with the inverter 21.

If a metal frame 56, extending like a beam in the rightward and leftward direction, is attached to the upper surface of the optional battery pack 50, the optional battery pack 50 can be supported on the vehicle body 2 by merely fastening the metal frame 56 to the right and left rear frames 13. Even an optional battery pack 50 with a large size and a heavy weight can be stably supported on the vehicle body 2.

The electric motor 19 is located at one side (in present example, left side) in the vehicle width direction with respect to the center WC in the vehicle width direction. Like the electric motor 19, the inverter 21 is located at one side (in present example, left side) in the vehicle width direction with respect to the center WC in the vehicle width direction. This makes it possible to reduce the wire connecting the inverter 21 and the electric motor 19 to each other, and easily carry out the operation for connecting the inverter 21 and the electric motor 19 to each other.

The electric motor 19 is located adjacent to the inverter 21 in the forward and rearward direction when viewed from above. The electric motor 19 protrudes forward farther than the driving power transmission mechanism 25 to be close to the inverter 21. The front portion of the electric motor 19 overlaps with the second accommodating section 24 in the vertical direction. In contrast, the optional battery pack 50 has a hollow space 58 formed by raising its bottom at one side in the vehicle width direction. The front portion of the electric motor 19 can be accommodated in the hollow space 58.

Figure 5:
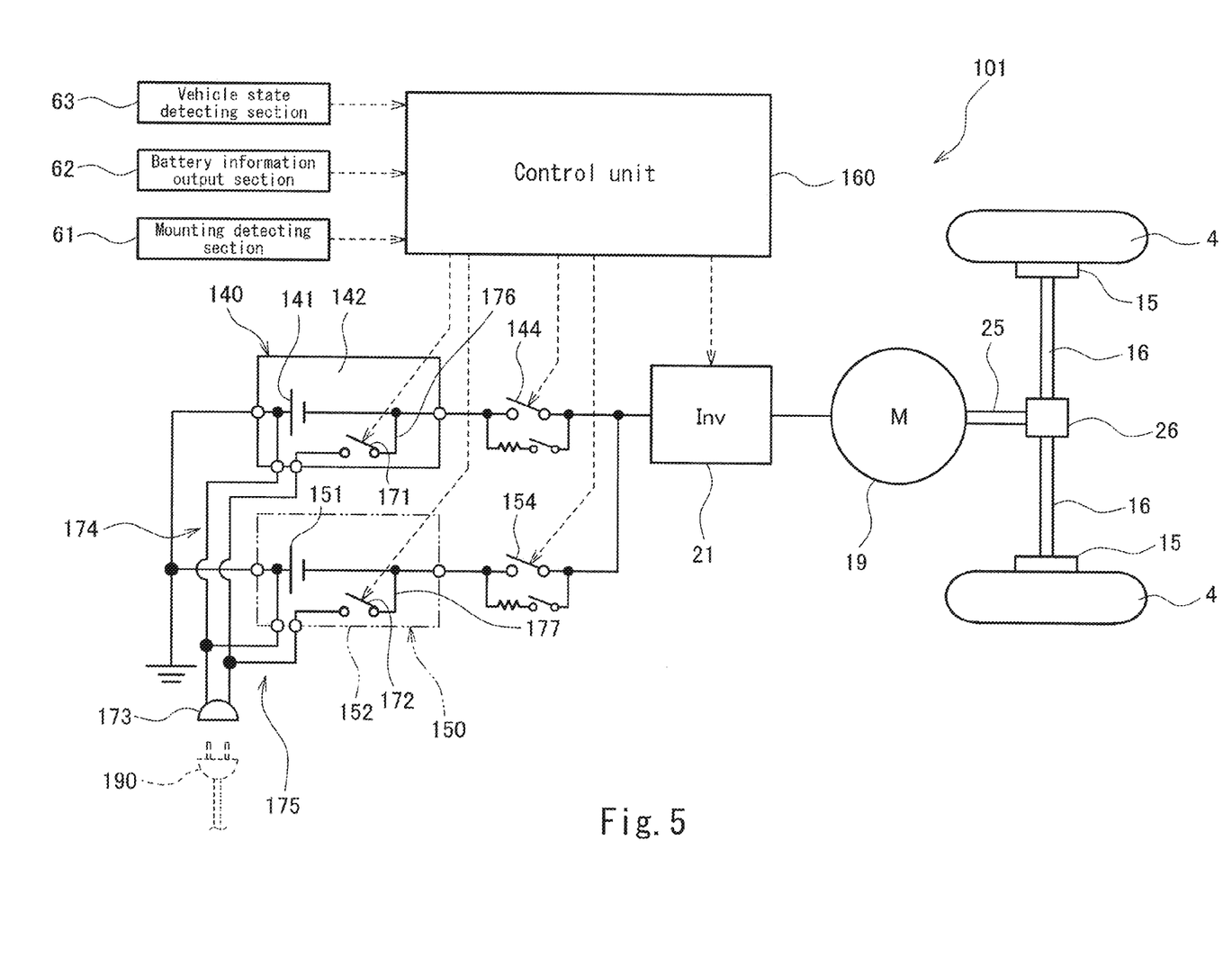
FIG. 5 is a block diagram showing the electric configuration of a utility vehicle according to Embodiment 2 of the present invention.

FIG. 4 is a block diagram showing the electric configuration of a utility vehicle 101 according to Embodiment 2 of the present invention. Hereinafter, differences from the above described embodiment will be mainly described. As shown in FIG. 4, in the utility vehicle 101 of the present embodiment, a first electric power supply switching unit 144 and a second electric power supply switching unit 154 are provided outside a casing 142 of a standard battery pack 140 and a casing 152 of an optional battery pack 150, respectively. It will be appreciated that the electric power supply switching units may not necessarily be provided inside the battery packs and may be mounted to the vehicle body 2.

The first electric power supply switching unit 144 may include an inrush current proof (preventing) resistor which is placed electrically in parallel with the switch or the relay which opens and closes the electric wire (hereinafter referred to as corresponding electric wire) connecting the corresponding first battery 151 to the inverter 21, and an inrush current proof relay connected in series with this resistor, as well as the switch and the relay. Since the first electric power supply switching unit 144 includes the inrush current proof (preventing) resistor and the inrush current proof relay as described above, it becomes possible to prevent a situation in which an excess current flows from the first battery 151 to the inverter 21, when switching from the second electric power supply state to the first electric power supply state occurs. The operation, performed for the switching from the second electric power supply state to the first electric power supply state, is such that the second electric power supply switching unit is opened, then the inrush current proof relay is closed and the relay on the corresponding electric wire is opened, and then the inrush current proof relay is opened and the relay on the corresponding electric wire is closed. The configuration of the second electric power supply switching unit 154 and the switching operation from the first electric power supply state to the second electric power supply state are the same as those in the case of the first electric power supply switching unit 144.

Although in the above described embodiment, the battery packs are provided with the charging ports 43, 53 (see FIG. 2 or 4), respectively, the utility vehicle 101 of the present embodiment includes a common charging connector corresponding to the plurality of battery packs. In the present embodiment, the battery packs are the standard battery pack 140 and the optional battery pack 150. Therefore, a charging connector 173 attached to the vehicle body is common to these two battery packs 140, 150, and is a single charging connector. The charging connector 173 is electrically connected to the first battery 141 inside the standard battery pack 140 accommodated in the first accommodating section 23, and is also electrically connected to the second battery 151 inside the optional battery pack 150, in a state in which the optional battery pack 150 is accommodated in the second accommodating section 24. The charging connector 173 is electrically and mechanically connectable to an outside connector and can be supplied with electric power from an outside electric power supply in a state in which the charging connector 173 is connected to the outside connector.

This configuration will be more specifically described. The vehicle body is provided with a first charging wire 174 extending from the charging connector 173 to the first accommodating section 23 and a second charging wire 175, which branches from the first charging wire 174 and extends to the second accommodating section 24. When the standard battery pack 140 is accommodated into the first accommodating section 23, a terminal attached to the outer surface of the standard battery pack 140 is electrically connected to the first charging wire 174. This terminal is electrically connected to the first battery 151 via a first internal pack charging wire 176 inside the standard battery pack 140. In the present embodiment, since the optional battery pack 150 has the same structure as that of the standard battery pack 140, the optional battery pack 150 includes a terminal and a second internal pack charging wire 177, as in the case of the standard battery pack 140. In a state in which the optional battery pack 150 is accommodated in the second accommodating section 24, the terminal is electrically connected to the second charging wire 175 and the charging connector 173 is also electrically connected to the second battery 151 via the second internal pack charging wire 177.

As described above, the charging connector 173 is connected in parallel with the first battery 141 and the second battery 151. Because of this, the user has to only connect the outside connector to the charging connector 173, to charge both the first battery 141 and the second battery 151. This makes it possible to easily carry out the operation for charging the batteries, as compared to a case where the battery packs are provided with the charging ports, respectively.

In the present embodiment, the utility vehicle 101 includes a first charging switching unit 171 for opening/closing the first internal pack charging wire 176, and a second charging switching unit 172 for opening/closing the second internal pack charging wire 177. In a state in which the first charging switching unit 171 closes the first internal pack charging wire 176, and electric power is supplied from the outside electric power supply to the charging connector 173, the first battery 141 can be charged with this electric power. Even when the electric power is supplied from the outside electric power supply to the charging connector 173, in a state in which the first charging switching unit 171 opens the first internal pack charging wire 176, the first battery 141 cannot be charged with this electric power. The same applies to the relationship between the opening/closing of the second charging switching unit 172 and whether or not the second battery pack 151 can be charged.

A control unit 160 operates the charging switching units 171, 172 with reference to the battery state information received from the battery information output section 62. Thus, in the present embodiment, the control unit 160 also serves as a charging control section which selects the battery to be charged with the electric power supplied from the charging connector 173, based on the battery state.

For example, the control unit 160 may close at least the charging switching unit corresponding to the battery with a lower remaining battery level, based on the remaining battery level information of the first battery 141 and the remaining battery level information of the second battery 151, which are the information received from the battery information output section 62. This makes it possible to prevent excess discharging of the battery with a lower remaining battery level, during vehicle storage and after the charging operation or during the next use of the vehicle. In this case, the charging switching unit corresponding to the battery with a higher remaining battery level may be closed or opened.

As should be understood from the above, in the present embodiment, the single charging connector 173 is used, and the battery to be charged is selected based on the battery state information while allowing the user to carry out the charging operation easily. This makes it possible to prevent a situation in which one of the batteries is charged excessively or the other battery is charged insufficiently.

At a time point when one of the batteries has been charged to some extent, even if the battery has not reached a fully charged state, the control unit may change the battery to be charged. For example, at a time point when the battery has been charged up to 80% of full charging, the control unit may change the battery to be charged. Further, the control unit 160 may determine which of the batteries should operate first as the electric power supply unit for the electric motor 19 during the next use, based on the battery state when charging has started, and preferentially select the battery to be expected to operate first as the electric power supply unit for the electric motor 19, as the battery to be charged. The battery that should operate first as the electric power supply unit for the electric motor 19 may be determined based on each of the degradation degree of the first battery 141 and the degradation degree of the second battery 151. In this case, the control unit 160 may determine that the battery with a lower degradation degree is the battery which should operate first as the electric power supply unit for the electric motor 19. If a difference between the remaining battery level of the first battery 141 and the remaining battery level of the second battery 151 exceeds a predetermined value, the electric power supply switching units may be closed so that the battery with a higher remaining battery level is discharged and the battery with a lower remaining battery level is charged.

Figure 6:
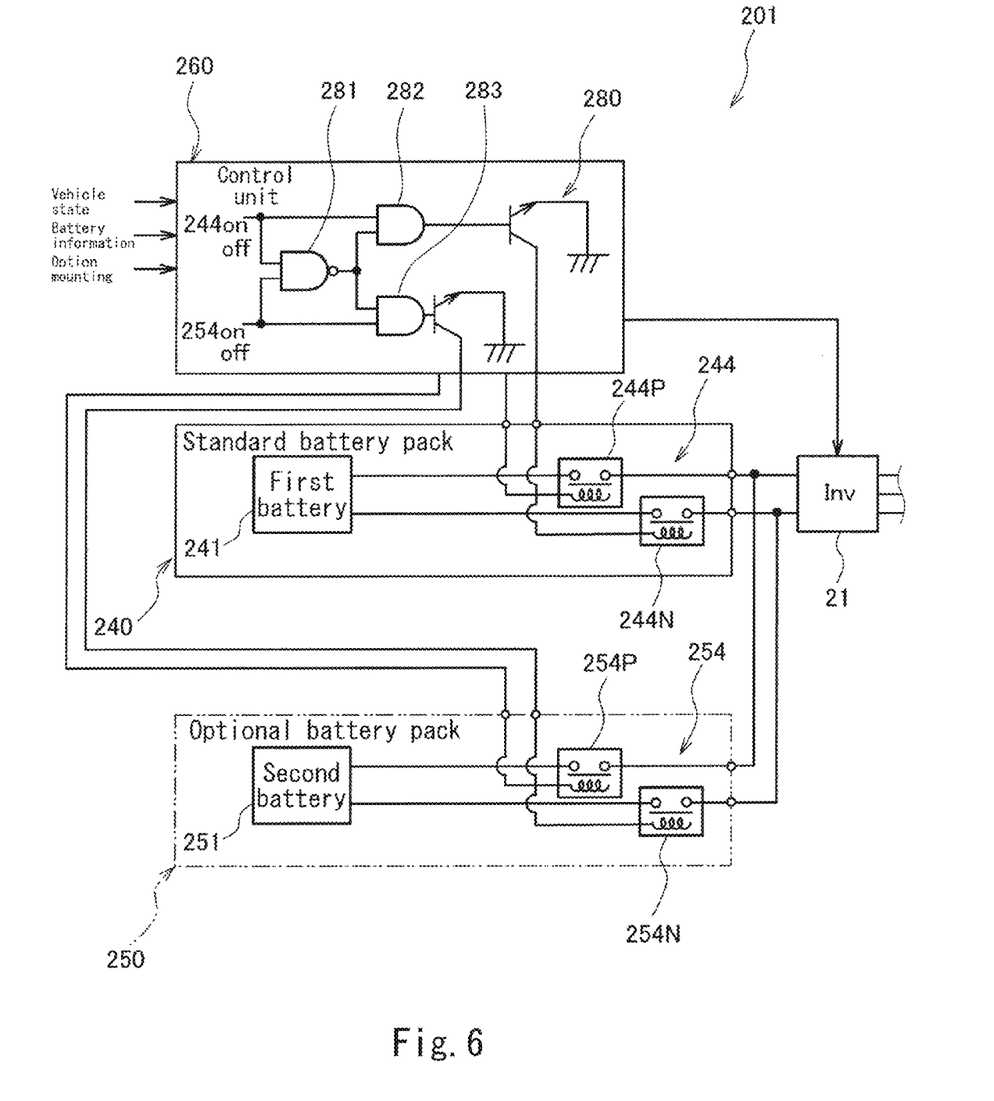
FIG. 6 is a block diagram showing the electric configuration of a utility vehicle according to Embodiment 3 of the present invention.

FIG. 6 is a block diagram showing the electric configuration of a utility vehicle 201 according to Embodiment 3 of the present invention. Hereinafter, the differences from the above described embodiments will be mainly described. As shown in FIG. 6, the utility vehicle 201 of the present embodiment includes an inhibiting circuit 280 for inhibiting the electric power from being supplied simultaneously from a first battery 241 and a second battery 251 to the inverter 21 and the electric motor (not shown in FIG. 6, see reference symbol 19 of FIG. 3). In the present embodiment, the inhibiting circuit 280 is incorporated into a control unit 260 which generates operation commands provided to a first electric power supply switching unit 244 and a second electric power supply switching unit 254. The inhibiting circuit 280 may be realized by a logic circuit including a plurality of logic gates, or other interlocking circuit.

FIG. 6 shows the inhibiting circuit 280 realized by the logic circuit. As shown in FIG. 6. the control unit 260 generates a first open/close signal indicating an open command or a close command to the first electric power supply switching unit 244, and a second open/close signal indicating an open command or a close command to the second electric power supply switching unit 254. The inhibiting circuit 280 includes first to third gates 281 to 283. Hereinafter, the open/close signal indicating the open command will be expressed as HIGH (1), and the open/close signal indicating the close command will be expressed as LOW (0).

The first gate 281 receives as inputs the first open/close signal and the second open/close signal. When the first and second open/close signals are HIGH(1), the first gate 281 outputs a LOW(0) signal, while when only one of the first and second open/close signals is HIGH(1), the first gate 281 outputs a HIGH (1) signal. When both the first and second open/close signals are LOW (0), the first gate 281 may output the HIGH(1) signal or the LOW(0) signal. Therefore, the first gate 281 may be a Sheffer stroke (NAND), an exclusive disjunction (XOR), or a combination of plural logic gates which are similar to NAND and XOR.

The second gate 282 receives as inputs the first open/close signal and the signal from the first gate 281, and outputs the HIGH(1) signal, namely, the close command to the first electric power supply switching unit 244, when the first open/close signal and the signal from the first gate 281 are HIGH(1). In other cases, the second gate 282 outputs the LOW(0) signal, namely, the open command to the first electric power supply switching unit 244. Because of this, a logical conjunction (AND) is preferably used as the second gate 282.

The third gate 283 receives as inputs the second open/close signal and the signal from the first gate 281, and outputs the HIGH(1) signal, namely, the close command to the second electric power supply switching unit 254, when the second open/close signal and the signal from the first gate 281 are HIGH(1). In other cases, the third gate 283 outputs the LOW(0) signal, namely, the open command to the second electric power supply switching unit 254. Because of this, a logical conjunction (AND) is preferably used as the third gate 283.

In the above described configuration, even when the first open/close signal and the second open/close signal are close commands, open commands are provided to the first electric power supply switching unit 244 and the second electric power supply switching unit 254, respectively. In other words, if the first open/close signal is the close command and the second open/close signal is not the open command, the second gate 282 does not provide the close command to the first electric power supply switching unit 244. Further, if the second open/close signal is the close command and the first open/close signal is not the open command, the third gate 283 does not provide the close command to the second electric power supply switching unit 254.

Because of the above, it becomes possible to prevent a situation in which both the first battery 241 and the second battery 251 operate as the electric power supply units for the electric motor at the same time. As a result, it becomes possible to avoid an electric failure in which a current flows from one of the first battery 241 and the second battery 251 to the other when there is a significant difference in remaining battery level between the first battery 241 and the second battery 251, for example.

The first electric power supply switching unit 244 may include a first P relay 244P provided on a high-voltage line (high-tension wire) (P), and a first N relay 244N provided on a ground wire (N). In this case, the command may be provided via the inhibiting circuit 280 to at least only one of the first P relay 244P and the first N relay 244N (FIG. 6 shows a case where the command is provided via the inhibiting circuit 280 to only the first N relay 244N). Likewise, the second electric power supply switching unit 254 may include a second P relay 254P and a second N relay 254N. The relationship between the inhibiting circuit 280 and the two relays 254P, 254N may be the same as that of the first electric power supply switching unit 244.

The present invention is not limited to the above described embodiment, and may be changed, added or deleted within a scope of the spirit of the present invention. For example, although in the above described embodiments, the vehicle includes the two battery packs, the number of battery packs and the number of the sections in which the battery packs are accommodated may be suitably changed, so long as the vehicle body includes the section accommodating the battery pack provided normally and the section accommodating the optional battery pack which is removably mounted to the vehicle body as desired according to the user's preference. In addition, although in the above described embodiments, the standard battery pack and the optional battery pack have the same structure, they may be different from each other in remaining battery level and shape.

Although in the above described embodiments, the electric vehicle of the present invention is applied to the utility vehicle 1, the present invention is applicable to an electric vehicle including right and left drive wheels, as well as the utility vehicle. The present invention is applicable to an electric three-wheeled vehicle including one driven wheel. Also, the present invention is applicable to a vehicle which is capable of being driven on a road with the driving power generated in the electric motor. Therefore, the present invention is also applicable to a hybrid vehicle including the electric motor as one of the components constituting the driving power source. Nonetheless, the present invention is suitably applicable to an electric vehicle that does not include any driving power source other than an electric motor.

INDUSTRIAL APPLICABILITY

The present invention can achieve an advantage, in that an electric vehicle which is capable of increasing a cruising distance and reducing a vehicle weight can be provided, and is effectively and widely applied to an electric vehicle such as a utility vehicle, which can achieve significant advantages.

REFERENCE CHARACTER LIST 1, 101, 201 utility vehicle (electric vehicle)
2 vehicle body
3 front wheel
4 rear wheel
19 electric motor
21 inverter
22 battery accommodating space
23 first accommodating section
24 second accommodating section
38, 39 identification structure
40, 140, 240 standard battery pack
41, 141, 241 first battery
44, 144, 244 first electric power supply switching unit
50, 150, 250 optional battery pack
51, 151, 251 second battery
54, 154, 254 second electric power supply switching unit
280 inhibiting circuit

The invention claimed is:

1. An electric vehicle comprising:
an electric motor which rotates a wheel;
a battery which is an electric power supply unit for the electric motor;
a battery accommodating space which is provided in a vehicle body and accommodates the battery therein; and
a control unit;
wherein the battery accommodating space includes a first accommodating section which accommodates therein a standard battery pack including a first battery as the battery, and a second accommodating section which accommodates therein an optional battery pack including a second battery as the battery such that the optional battery pack is removable from the vehicle body,
wherein the first battery stores energy at a voltage and the electric vehicle is capable of driving with an electric power supplied from at least the first battery,
wherein the standard battery pack and the optional battery pack have the same structure,
wherein the vehicle body has an identification structure for allowing the standard battery pack or the optional battery pack to identify whether the standard battery pack or the optional battery pack is accommodated in the first accommodating section or in the second accommodating section, and
wherein the control unit provides operation commands to each of the standard battery pack and the optional battery pack, and each of the standard battery pack and the optional battery pack identifies the corresponding operation command, among the operation commands provided by the control unit, and is configured to operate in response to the identified operation command.

2. The electric vehicle according to claim 1, further comprising:
an electric power supply switching unit which performs switching of an electric power supply state between a first electric power supply state in which only the electric power stored in the first battery is supplied to the electric motor, and a second electric power supply state in which the electric power stored in at least the second battery is supplied to the electric motor in a state in which the optional battery pack is mounted to the vehicle body.

3. The electric vehicle according to claim 2,
wherein a voltage of the second battery is a value corresponding to the voltage of the electric motor, and the second battery is electrically connected in parallel with the first battery in a state in which the optional battery pack is accommodated in the second accommodating section, and
wherein in the second electric power supply state, the electric power stored in the second battery is supplied to the electric motor and the first battery is disconnected from the electric motor.

4. The electric vehicle according to claim 3, further comprising:
an inhibiting circuit which inhibits the electric power from being simultaneously supplied from the first battery and the second battery to the electric motor.

5. The electric vehicle according to claim 2, wherein
the control unit is configured to control the electric power supply switching unit to perform switching of the electric power supply state based on a battery state and/or a vehicle state.

6. The electric vehicle according to claim 5,
wherein the control unit is configured to, when a remaining battery level of one of the first and second batteries reaches a switching remaining battery level set to a value which is higher than a limit remaining battery level at which the electric motor cannot be activated well, control the electric power supply switching unit to supply the electric power stored in the other of the first and second batteries to the electric motor.

7. The electric vehicle according to claim 5,
wherein the control unit configured to control the electric power supply switching unit to perform switching of the electric power supply state during driving, which is other than accelerated/decelerated driving.

8. The electric vehicle according to claim 5,
wherein the control unit is configured to control the electric power supply switching unit to perform switching of the electric power supply state, based on driving torque.

9. The electric vehicle according to claim 5,
wherein the control unit is configured to control the electric power supply switching unit to perform switching of the electric power supply state during a state in which the electric power is not supplied to the electric motor.

10. The electric vehicle according to claim 2, wherein
the control unit is configured to control the electric power supply switching unit to perform switching of the electric power supply state in response to a switching command provided by a driver.

11. The electric vehicle according to claim 2, wherein
the control unit is configured to control the electric power supply switching unit to perform switching of the electric power supply state such that the first battery or the second battery, which has a lower remaining battery level, is connected to the electric motor, in a state in which the electric motor is generating a regenerative power.

12. The electric vehicle according to claim 1, further comprising:
a charging connector which is electrically connected to the first battery, the charging connector being connected to the second battery in a state in which the optional battery pack is accommodated in the second accommodating section; and
a charging control section which selects the battery to be charged with the electric power supplied from the charging connector, based on a battery state.

13. The electric vehicle according to claim 1,
wherein the first accommodating section and the second accommodating section are longer in dimension in a rightward and leftward direction than in a forward and rearward direction, and are arranged in the forward and rearward direction, and
wherein the second accommodating section is placed below a cargo bed and exposed by banking the cargo bed.

14. The electric vehicle according to claim 13,
wherein the first accommodating section is placed in a center portion of the electric vehicle in a vehicle length direction and below a seat.

15. The electric vehicle according to claim 13, further comprising:
an inverter which converts the electric power stored in the battery into AC power and supplies the AC power to the electric motor,
wherein the inverter is adjacent to the battery accommodating space at one side in a vehicle width direction.

16. The electric vehicle according to claim 15,
wherein the electric motor is positioned at the one side in the vehicle width direction, with respect to a center in the vehicle width direction.

17. The electric vehicle according to claim 1, further comprising:
a first battery monitoring unit which is provided in the standard battery pack and outputs state information of the first battery; and
a second battery monitoring unit which is provided in the optional battery pack and outputs state information of the second battery.

18. The electric vehicle according to claim 17, further comprising:
an electric power supply switching unit which performs switching of an electric power supply state between a first electric power supply state, in which only the electric power stored in the first battery is supplied to the electric motor, and a second electric power supply state, in which the electric power stored in at least the second battery is supplied to the electric motor in a state in which the optional battery pack is mounted to the vehicle body; and
wherein the control unit is configured to control the electric power supply switching unit to perform switching of the electric power supply state based on state information of the first battery, which is output from the first battery monitoring unit, and state information of the second battery, which is output from the second battery monitoring unit.

* * * * *